Feb. 2, 1943. H. F. B. HÖGFORS 2,309,901
CASH REGISTERS, ADDING AND ACCOUNTING MACHINES, AND THE LIKE
Filed May 3, 1937 13 Sheets-Sheet 1

Feb. 2, 1943. H. F. B. HÖGFORS 2,309,901
CASH REGISTERS, ADDING AND ACCOUNTING MACHINES, AND THE LIKE
Filed May 3, 1937 13 Sheets-Sheet 3

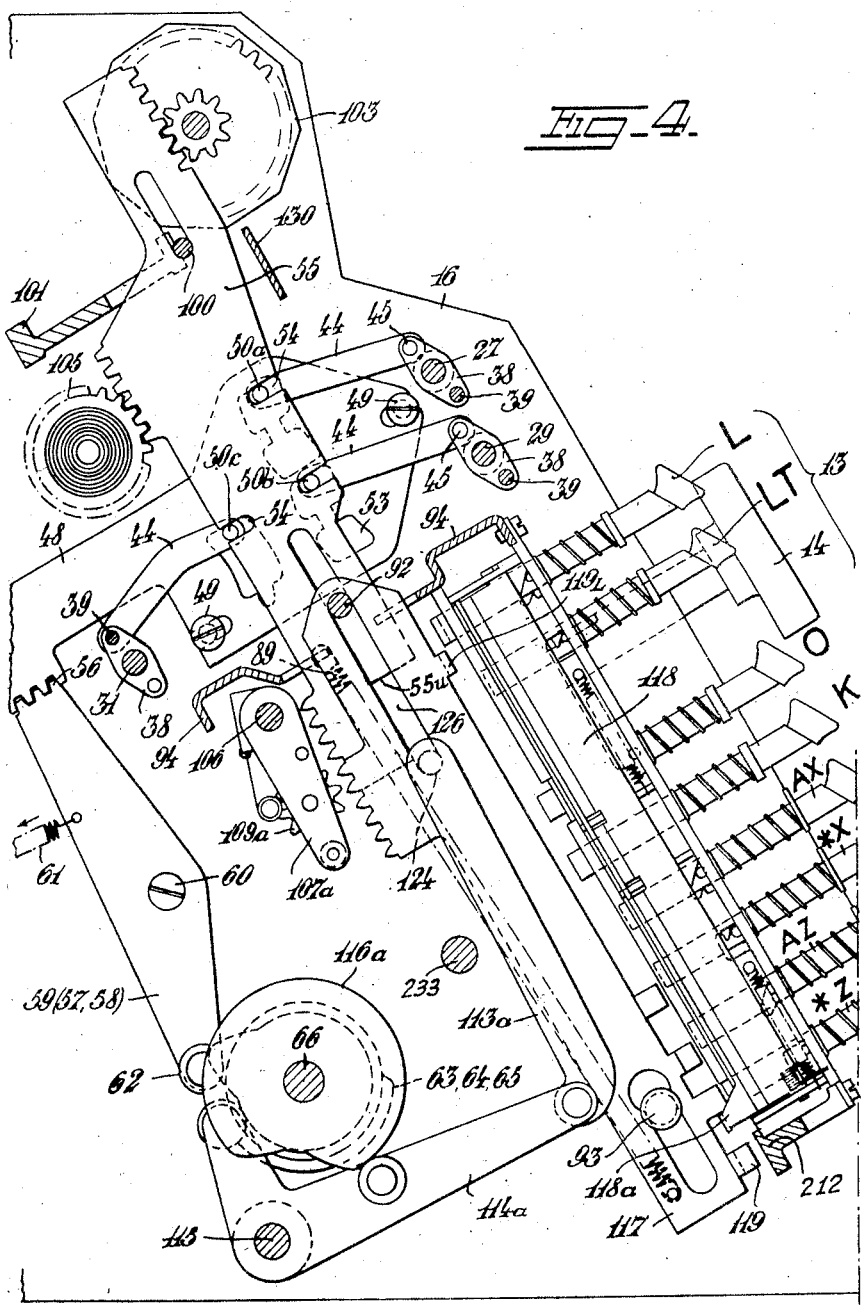

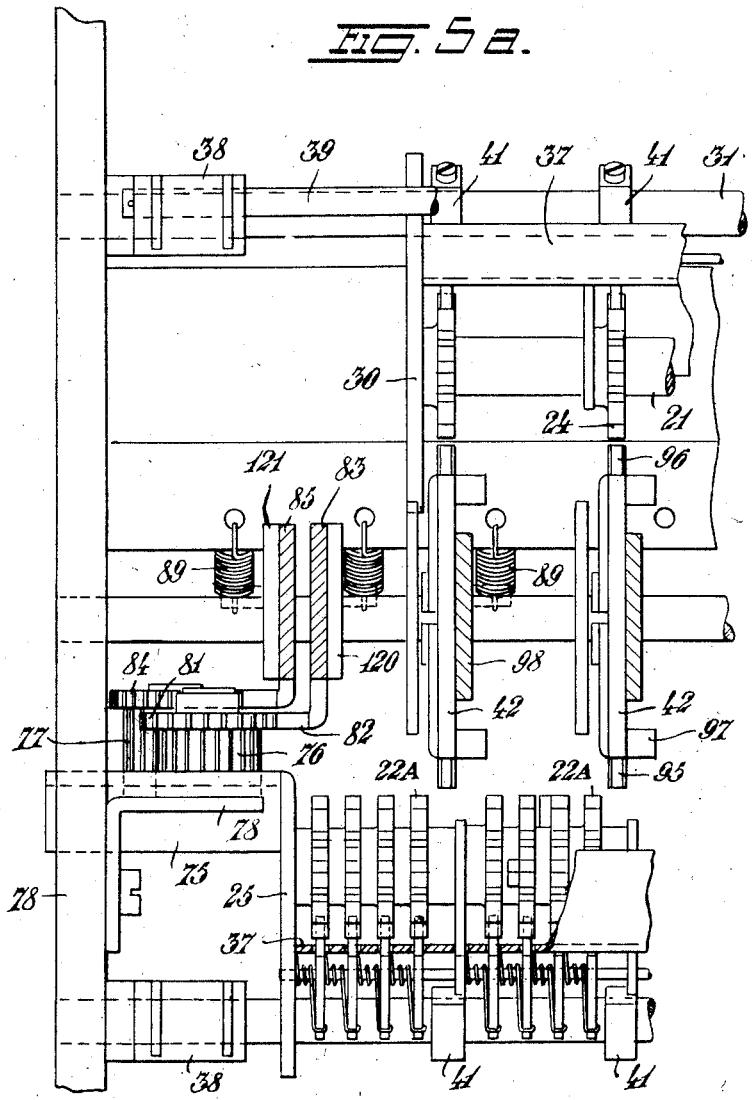

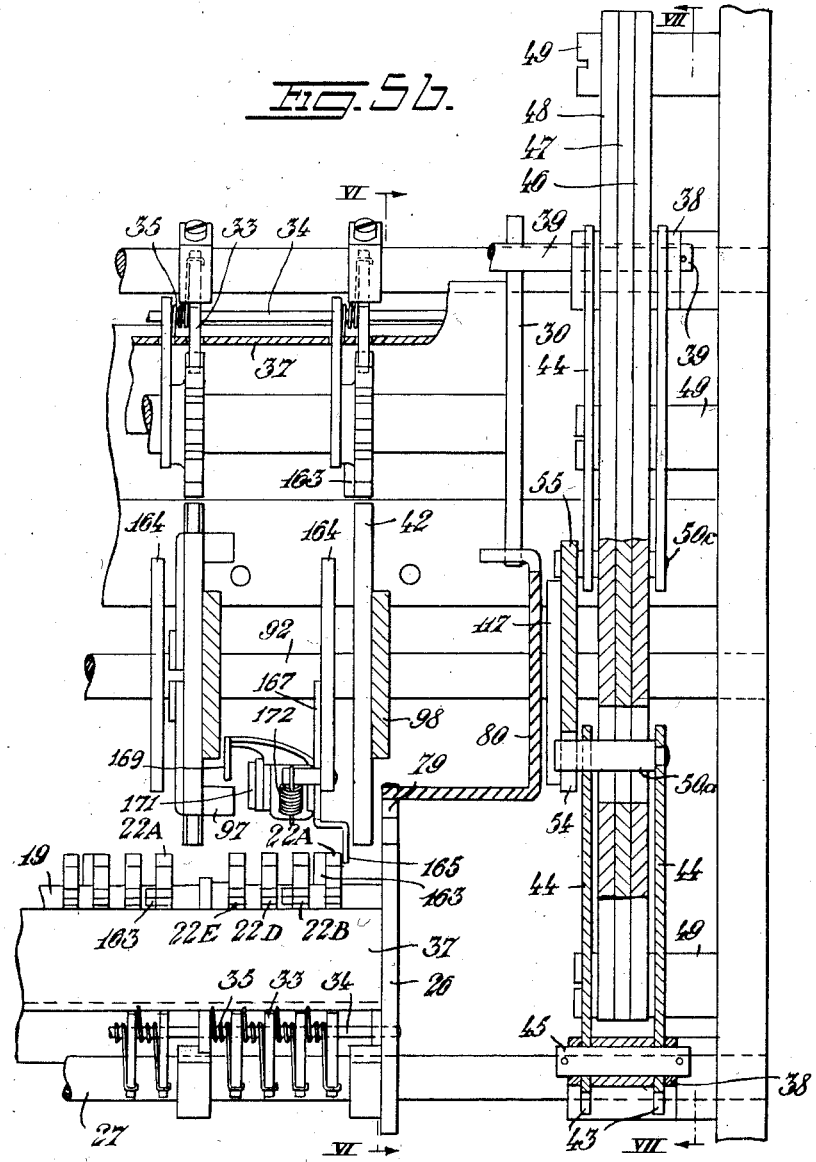

Feb. 2, 1943. H. F. B. HÖGFORS 2,309,901
CASH REGISTERS, ADDING AND ACCOUNTING MACHINES, AND THE LIKE
Filed May 3, 1937 13 Sheets-Sheet 7
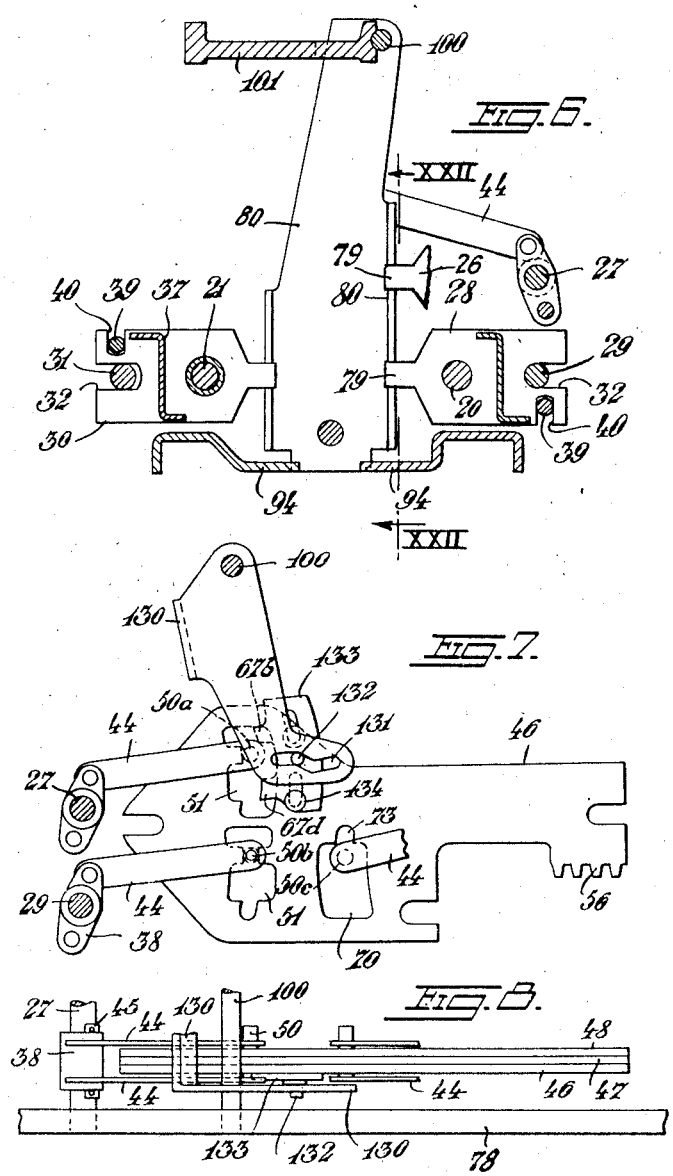

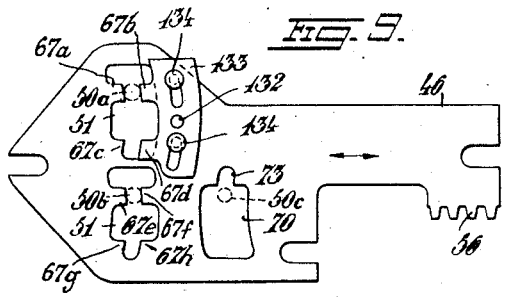

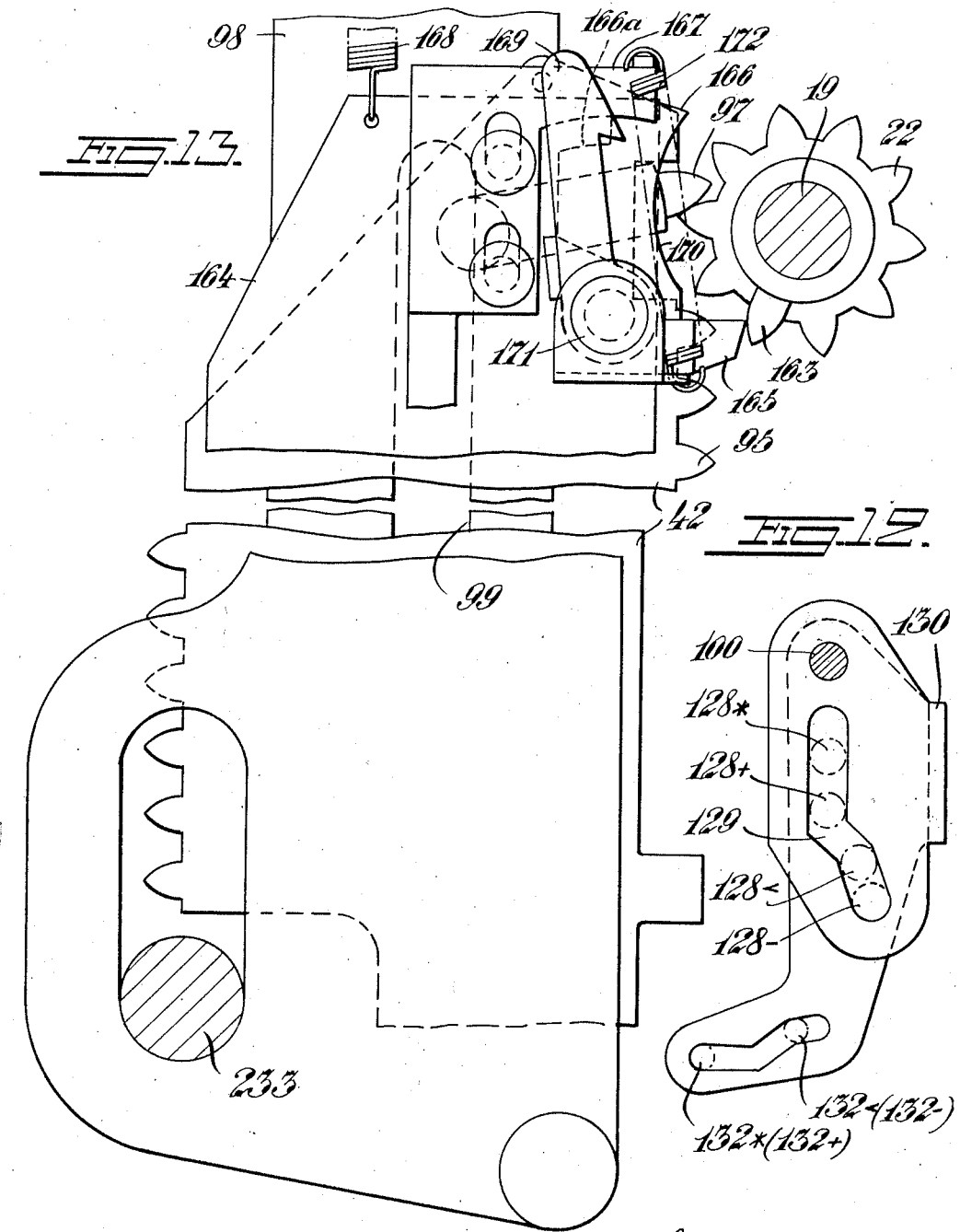

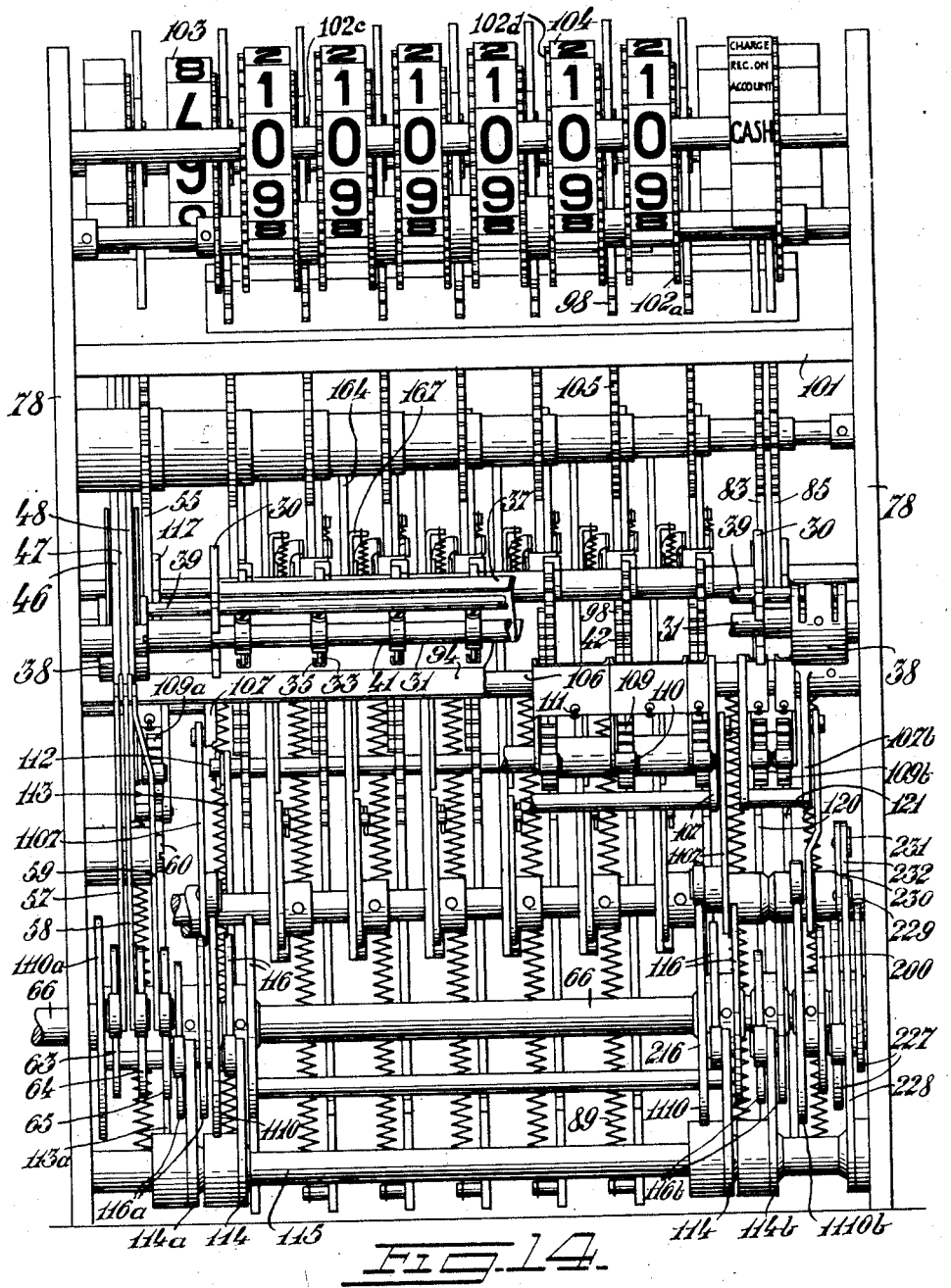

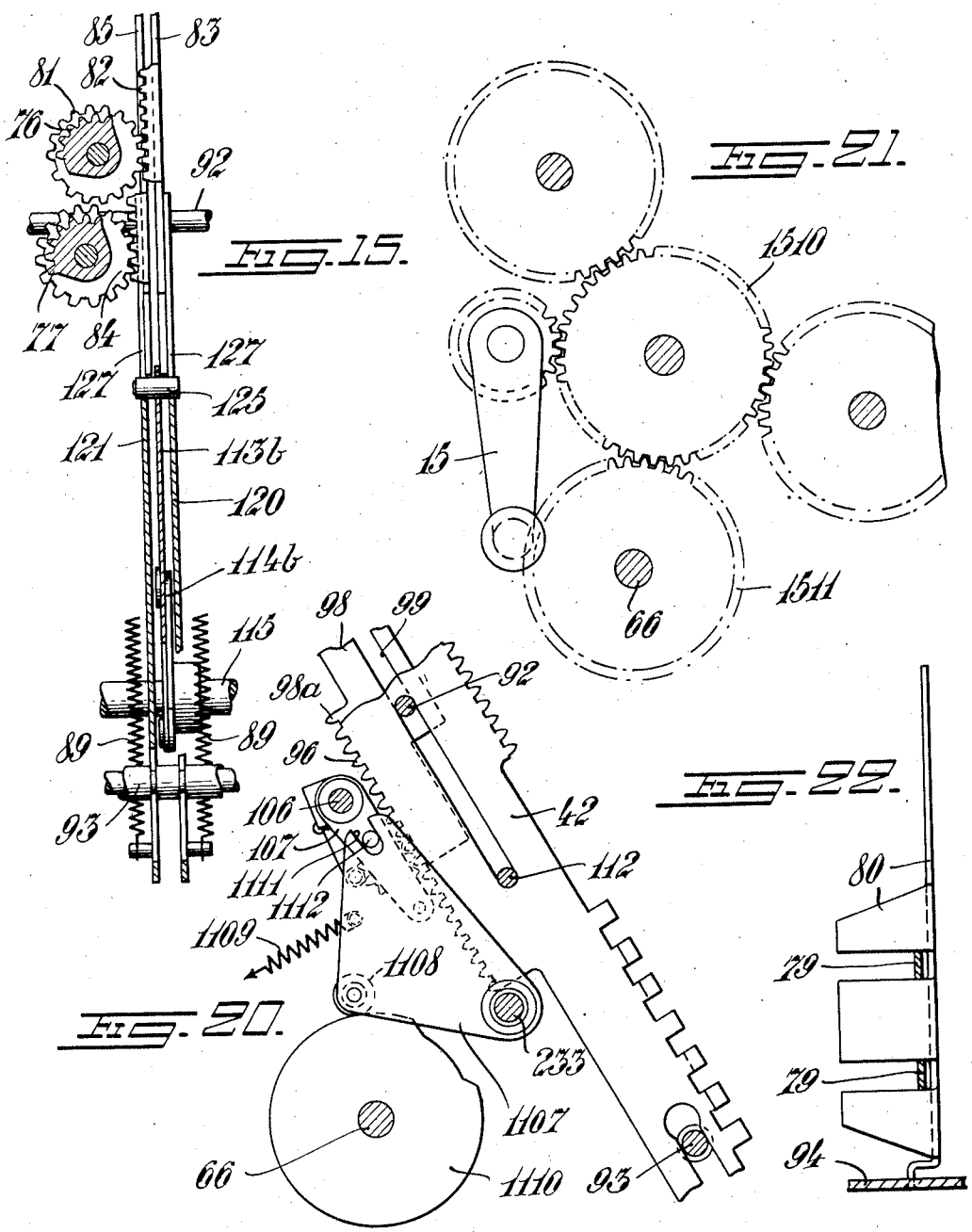

Feb. 2, 1943. H. F. B. HÖGFORS 2,309,901
CASH REGISTERS, ADDING AND ACCOUNTING MACHINES, AND THE LIKE
Filed May 3, 1937 13 Sheets-Sheet 12
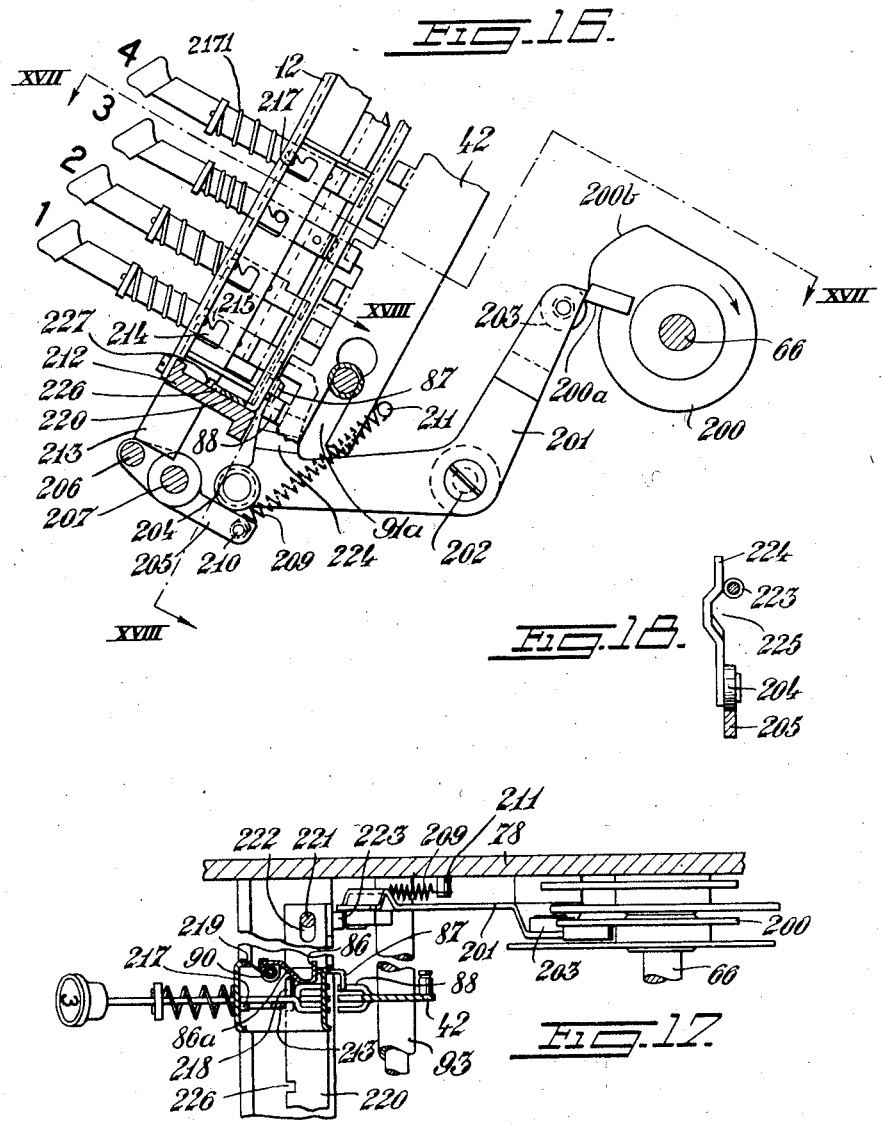

Feb. 2, 1943.                H. F. B. HÖGFORS                2,309,901
    CASH REGISTERS, ADDING AND ACCOUNTING MACHINES, AND THE LIKE
                    Filed May 3, 1937         13 Sheets-Sheet 13

Fig.19.

| FIG. | CAM NO. | 0° | 20 | 40 | 60 | 80 | 100 | 120 | 140 | 160 | 180 | 200 | 220 | 240 | 260 | 280 | 300 | 320 | 340 | 360° |
|---|---|---|---|---|---|---|---|---|---|---|---|---|---|---|---|---|---|---|---|---|
| 14 | 1110a | OUT | IN | | | | | | PINION 109a HELD IN MESH WITH KIND OF OPERATION RACKS | | | | | | | | | OUT | | |
| 14 | 63 | | | | | | | | | | IN TOTALIZERS ROCKED FOR ADDITION | | | | | | OUT | | | |
| 14 | 64 | | | | | IN | | | | | TOTALIZERS ROCKED FOR READING | | | | | | OUT | | | |
| 14 | 65 | | | | | IN | TOTALIZERS R.F. RESETTING | OUT | | | | | | | | | | | | |
| 4-14 | 116a | ELEVATION | LOWERING OF KIND OF OPERATION RACKS | | | | | | | | | | | | | | | | | |
| 14 | 1110 | | | | | | OUT | | | | IN | PINIONS 109 HELD IN MESH WITH AMOUNT RACKS | | | | | | | | |
| 2-14 | 116 | | | | | | ELEVATION | | | LOWERING OF AMOUNT RACKS | | | | | | | | | | |
| 14 | 116b | | | ELEVATION | | LOWERING OF TOTALIZER SELECTION RACKS | | | | | | | PINIONS 109b HELD IN MESH WITH TOTALIZER SELECTION RACKS | | | | | RELEASED | | |
| 3-14 | 1110b | OUT | IN | | | | | | | | | | | | | | | | | |
| 14 | 200 | | | | | KEYBANKS LOCKED | | | | | | | | | | | | | | |
| 14 | 227 | | | | | | | | | | | | | | | | | TENS TRANSFER | | RETURNING TO NORMAL |

Inventor
Hans F. B. Högfors
By Sommers & Young Attys

Patented Feb. 2, 1943

2,309,901

UNITED STATES PATENT OFFICE 2,309,901

CASH REGISTER, ADDING AND ACCOUNTING MACHINE, AND THE LIKE

Hans Fredrik Birger Högfors, Enskede, near Stockholm, Sweden, assignor to Svenska Kassaregisteraktiebolaget, Stockholm, Sweden, a joint-stock company of Sweden Application May 3, 1937, Serial No. 140,520
In Sweden May 7, 1936

3 Claims. (Cl. 235—7)

The chief object of this invention is to construct cash registers, adding and accounting machines and the like so as to render the machine more useful for all-round purposes than previous machines.

Thus, one purpose of this invention is to render it possible to effect multiple items operations in connection with all types of transactions; that is: not only in connection with cash and received-on-account transactions but also for charge (credit sale) and paid-out transactions.

Another object of this invention is to render it possible to transfer the total from the multiple items totalizer selectively to one or more other totalizers or to keep it in said multiple items totalizer only; and this is effected independently of whether the totalizers are actuated independently of each other or are arranged in mutually interdependent groups. Thus, in cash registers, which have clerks and transaction totalizers and in which the clerks totalizers remain disengaged during charge and paid-out transactions, the multiple items total is transferred to the transaction totalizer concerned but not to any clerks totalizer, at charge and paid-out transactions.

A further purpose of this invention is to render it possible to effect multiple items operations in such manner that either of each individual multiple item is transferred to one or more selected totalizers at each operation of the machine or only the multiple items total (but not the individual multiple items) is transferred to the selected totalizer or totalizers.

Another object of this invention is to construct the multiple items totalizer as an entirely independent totalizer, having no influence upon the other totalizers, that is, the clerks and transaction totalizers.

Still another object of this invention is to render it possible to effect multiple items operations for all types of transactions including credit and paid-out transactions under the control of one single multiple items operation key and one single multiple items total-taking key. Thus, in accordance with this invention, one single multiple items key and one single multiple items total-taking key suffice for the control, independently of the number of totalizers used. A further object of this invention is to simplify the means for setting the machine to different kinds of operations (adding, reading, resetting, multiple items operation, multiple items total-taking) by means of keys. Thus, in accordance with the invention the setting and indicating members for the kind of operation may be shaped as straight racks, thus rendering the construction of such members very simple. This also renders it possible to construct the machine for many different kinds of operation and also to transfer items between the different groups of totalizers in a greater number of combinations than was heretofore possible.

Other objects of this invention will be evident from the following specification and claims.

One embodiment of the invention is illustrated in the annexed drawings.

Fig. 4 shows a section on the line IV—IV of Fig. 1 and illustrates especially the kind of operation key bank and the adjacent parts.

Figs. 5a and 5b show together the essential parts of a view as seen obliquely from above (or a section on the line V—V in Fig. 2), Fig. 5a being the left and Fig. 5b the right part of such view. The central part of the view has been broken away and omitted, that is, between Fig. 5a and Fig. 5b, when laid side by side, there are in the machine parts not shown which are quite analogous with those shown in the right-hand part of Fig. 5a and in the left-hand part of Fig. 5b. Also, in Figs. 5a and 5b the lower edge corresponds to the front side (key side or clerk's side) of the machine and the upper edge to the back side (customer's side) of the machine.

Fig. 6 shows a side view of a detail, that is substantially a section on the line VI—VI of Fig. 5b, some parts being broken away.

Fig. 7 shows a side view of a detail, that is substantially a section on the line VII—VII of Fig. 5b, some parts being broken away.

Fig. 8 is a top view of the parts shown in Fig. 7.

Figs. 9, 10 and 11 are side views of the coupling plates for connecting and disconnecting the totalizers for different kinds of operations. Thus, Fig. 9 shows the plate for addition, Fig. 10 the plate for resetting and Fig. 11 the plate for reading the totalizers.

Fig. 12 shows a detail of a device for preventing the clerks' totalizers from being operated, when sale on credit or paying out is effected.

Fig. 13 shows a detail of the tens transfer mechanism during a resetting operation.

Fig. 14 shows a rear view of the machine.

Figure 3:
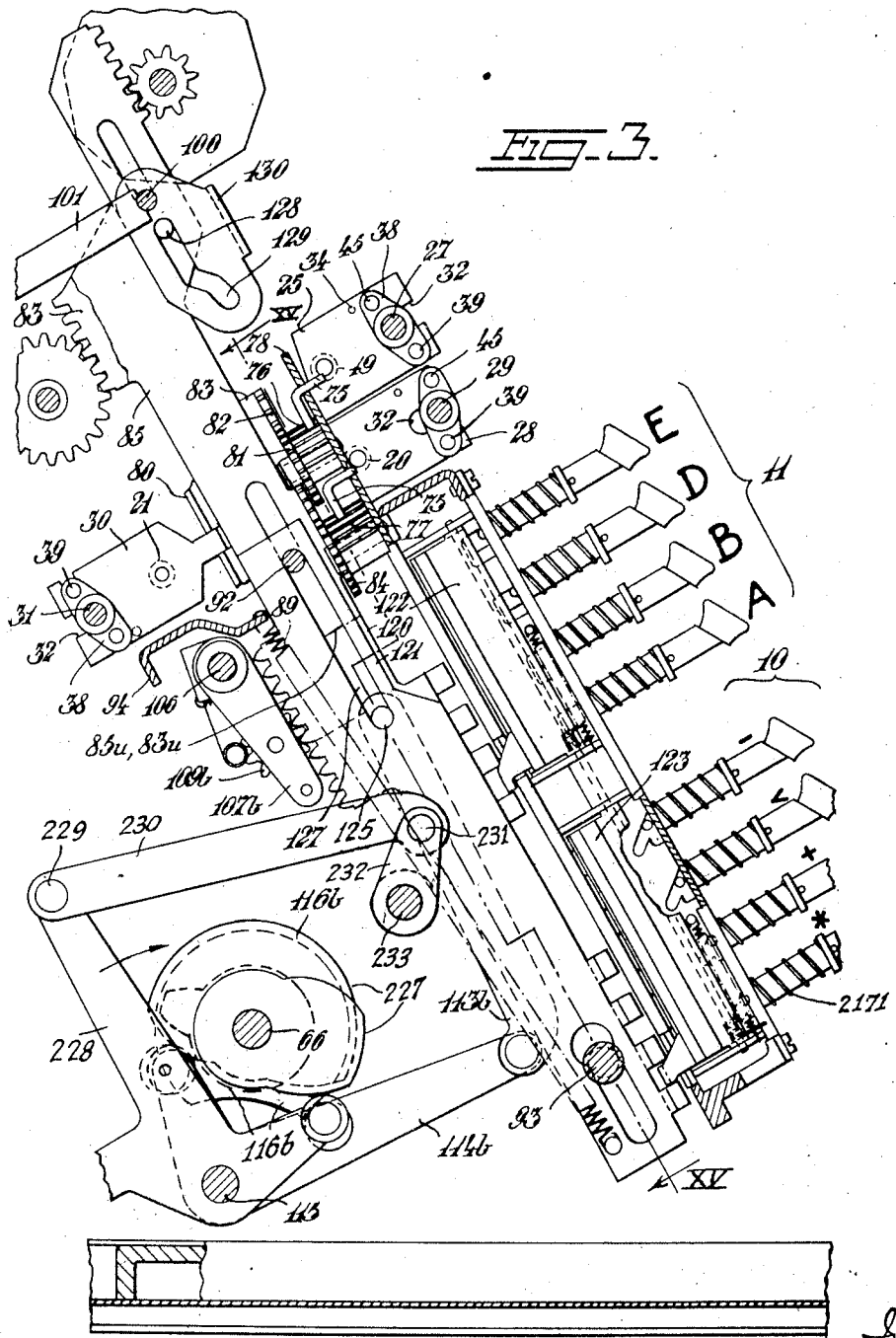
Fig. 3 shows a section on the line III—III of Fig. 1 and shows particularly the key bank for selecting the totalizers, that is, clerk's totalizers and transaction totalizers and the adjacent parts. This bank is also called the selector bank.

Fig. 15 shows a partial section through the totalizer setting and selecting racks, on the line XV—XV in Fig. 3.

Figure 1:
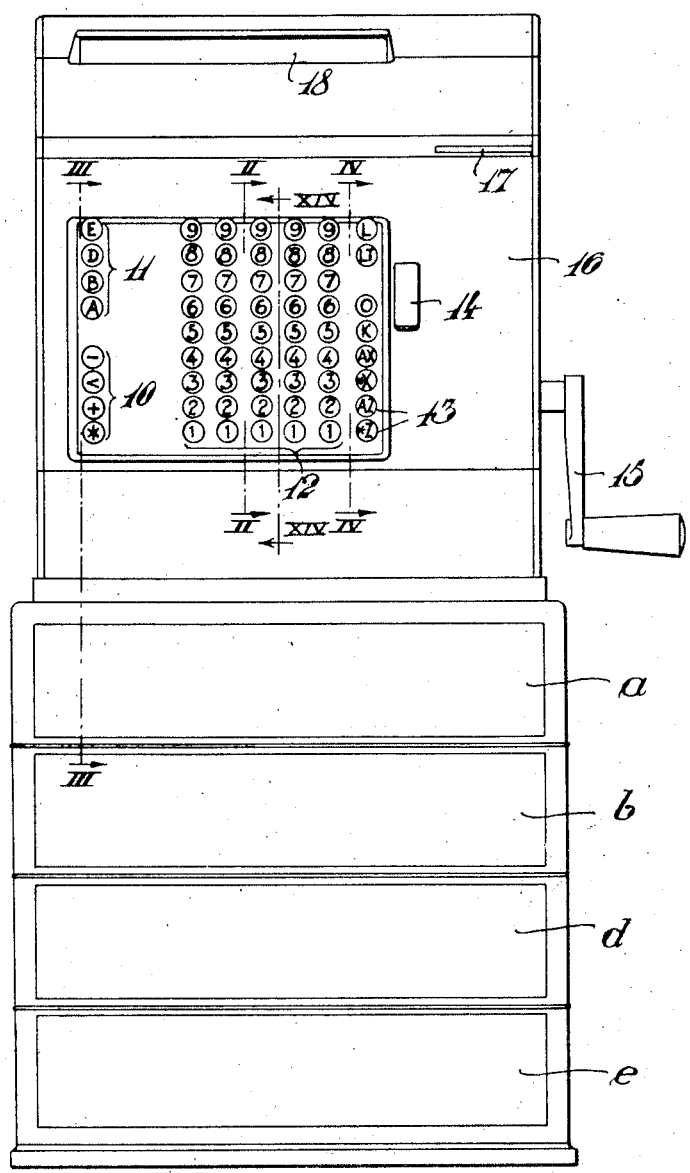
Fig. 1 shows a front view of a cash register in accordance with this invention.

Fig. 16 shows a section on the line XVI—XVI in Fig. 1 through the lower part of an amount key bank.

Fig. 17 shows a section on the line XVII—XVII in Fig. 16.

Fig. 18 shows a section on the line XVIII—XVIII in Fig. 16, some parts being broken away.

Fig. 19 shows a timing chart, showing the action of all the cams shown in Fig. 14.

Fig. 20 is a section showing the coupling devices for the amount racks.

Fig. 21 shows the manually operated crank and the gears between it and the main driving shaft.

Fig. 22 shows a section on line XXII—XXII in Fig. 6.

Figs. 5a, b and 13 are on a larger scale and Fig. 1 on a smaller scale. Reference is made to the fact that in the various figures the totalizers are sometimes shown in different positions of operation.

The cash register shown in the drawings has two groups or lines of totalizers, each group comprising four totalizers. One group represents four clerks (assistants or salespersons) and the other represents four types of transactions. In addition, there is a ninth totalizer for multiple items operations.

*Keyboard*

Fig. 1 shows the complete machine. In the left part of the keyboard there is a key bank (the selector bank) having four lower keys 10 for selecting the transaction totalizers and four upper keys 11 for selecting the clerks' totalizers. The five middle key banks 12 are adapted for setting the amounts or values. In this case the maximum setting capacity is consequently 999.99. The outer right-hand key bank or kind of operation bank 13 is adapted for setting the machine for different kinds of operations.

The amount keys are marked with the corresponding numbers and the keys 10, 11 and 13 carry following signs:

*Types of transactions*

\* =Cash.
+=Received on account.
< =Charge (sale on credit).
— =Paid out.

*Clerks*

A=First clerk.
B=Second clerk.
D=Third clerk.
E=Fourth clerk.

*Kinds of operations*

L =Listing, that is multiple items operation (entering dependent items).
LT =Listing total or total-taking after listing, that is, multiple items total-taking. Such taking the total of dependent items may include the transfer of the total to a transaction totalizer and possibly also to a clerk's totalizer.
O =Non-print (no check).
K =Correction (error).
AX=Reading or taking a subtotal from a clerk's totalizer.
\*X =Reading or taking a subtotal from a transaction totalizer.
AZ =Resetting or clearing a clerk's totalizer, that is taking a total from such totalizer.
\*Z =Resetting or clearing a transaction totalizer, that is taking a total from such totalizer.

To the right of the keyboard there is a starting key 14, both in manually operated and in motor-driven machines, for connecting in the driving device. The key 14 must be depressed, before the machine can be started by means of the crank or handle 15 of a motor. In motor-driven machines the motor is started in well-known manner, when the key 14 is depressed. The machine as shown is manually operated and for each registration the crank 15 must be rotated two revolutions.

The mechanism is enclosed in a hood or casing 16, which on the front side, i. e., the clerk's side, has an opening 17 for ejecting the printed receipt or check and a window 18. A similar window is on the back side, the customer's side. In these windows the registered amounts are shown, and in the clerk's window 18 also the initial A, B, D, or E of the clerk and the name or the sign of the transaction (\*+<—) and of the kind of operation, that is, L, LT, addition, reading, resetting, are shown.

The machine has four cash drawers $a$, $b$, $d$, $e$ for the clerks A, B, D, and E, respectively.

The construction of the mechanism for selecting the drawers and other details in connection with the drawers are shown and claimed in my United States patent application for "Improvements in cash registers," Serial No. 140,521, filed May 3, 1937. The present application does not claim anything which is claimed in the co-pending application Serial No. 140,521, or in my United States Patent No. 2,143,599.

*Totalizers*

Figure 2:
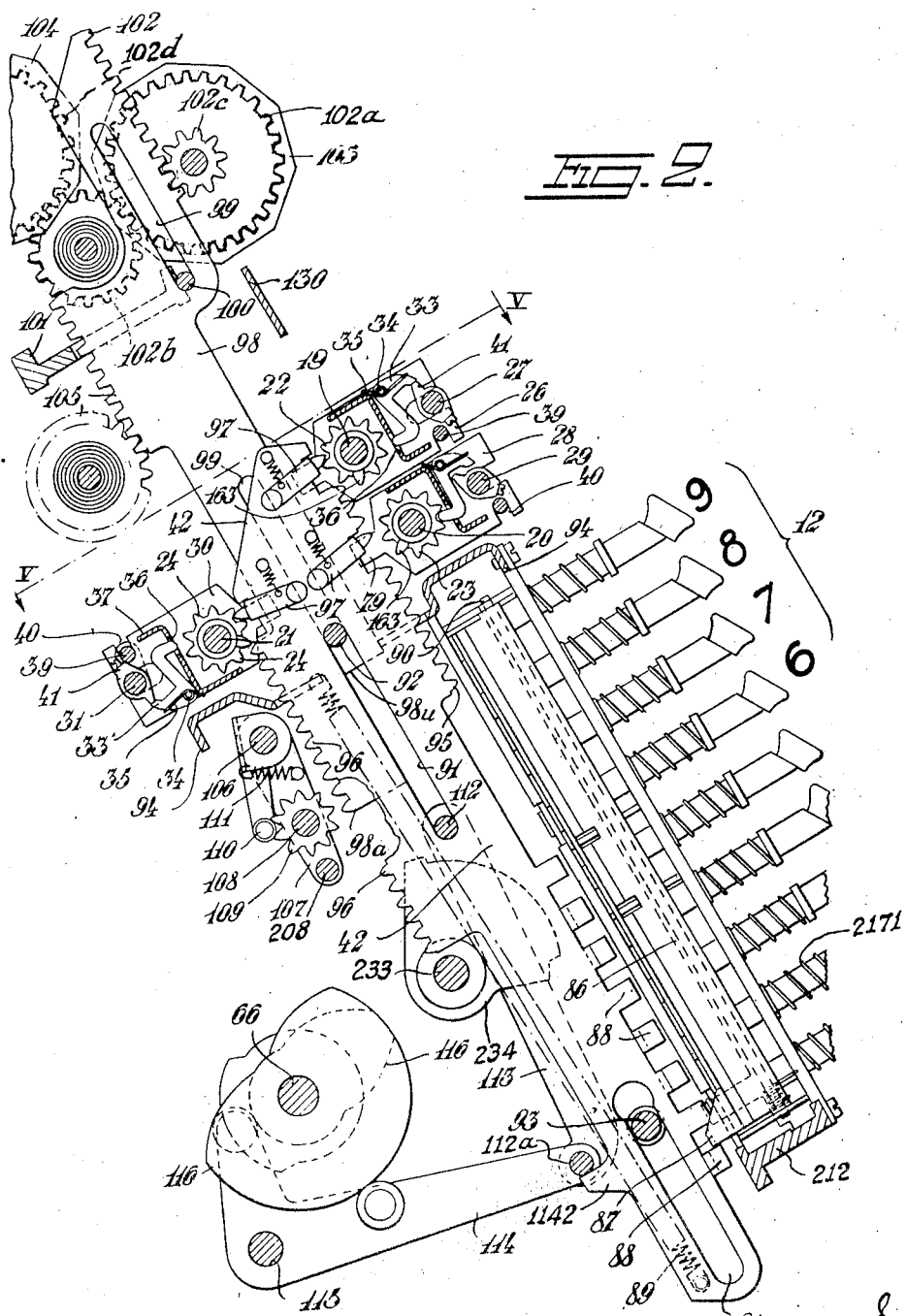
Fig. 2 shows a vertical section on the line II—II in Fig. 1 between two number or amount key banks.

The machine has shafts 19, 20, 21, Fig. 2, for the clerks' totalizers, the transaction totalizers and the listing or multiple items totalizer, respectively. The toothed wheels or pinions of the clerks' totalizers are indicated by 22 in general, 22A indicating the wheels of the clerk A's totalizer, 22B the wheels of the clerk B's totalizer, etc., Figs. 5a, b. The wheels or pinions of the transaction totalizers are indicated by 23 and those of the listing or multiple items totalizer by 24. Each totalizer comprises seven wheels (maximum capacity 99,999.99). The ends of the shaft 19 are secured in end plates 25, 26 forming—together with said shaft and the totalizers 22—a carriage, displaceable axially and also radially on a shaft 27, which is rotatably but not slidably journalled in the stationary machine frame 70. Similarly, the shaft 20 is secured to end plates 28, Fig. 3, forming a carriage together with the shaft 20 and the totalizers 23. This carriage is axially and radially displaceable on a shaft 29, which is rotatably but not slidably journalled in the machine frame. The shaft 21 for the totalizer 24 is secured to end plates 30, which are displaceable radially but not axially on a shaft 31, which is rotatably but not slidably journalled in the machine frame. The end plates 25, 26, 28, 30 have slots 32, Fig. 6, for the shafts 27, 29, 31, rendering it possible to displace the totalizers 22—24 radially or laterally on said shafts. Each totalizer wheel 22, 23, 24 has a locking arm or catch 33, Figs. 2, 5a, b. The catches 33 are rotatably journalled on shafts 34 secured to the end plates 25—26, 28 or 30, respectively. Each catch 33 is normally kept in engagement with the corresponding totalizer wheel by a spring 35 and is guided laterally by slots 36 in a connecting plate 37, uniting the end plates.

On the rotatable shafts 27, 29, 31 lever blocks 38 are secured one on each side of the totalizer groups, Figs. 5a, b. The two blocks 38 on the same shaft also carry the shaft 39, parallel to said shaft and passing through slots 40 in the end plates 25, 26, 28, 30, Fig. 2. On the shafts 27, 29, 31 fingers 41 are secured, corresponding in number to the capacity of the totalizers, Figs. 5a and 5b. Thus, in the embodiment shown seven fingers are secured on each shaft, which are always just opposite the amount setting racks or actuators 42. (In Figs. 5a, 5b only four fingers 42 are visible on each of the shafts 31 and 27). When the shaft 27, 29, or 31 is rocked, the fingers 41 will release the catches 33 from the totalizer wheels then in operative position, while the catches of the totalizer wheels in inoperative position remain in engagement. During the calculating and registering operations the wheels of the selected totalizer, when in engagement with the setting racks, are consequently entirely free from spring-pressed locking arms or other catches.

*Totalizer engaging mechanism*

In slots 43 (Fig. 5b) of certain of the blocks 38 arms 44 are rotatably journalled on pins 45 for the clerks' and transaction totalizers and on the shaft 39 for the mutiple items totalizer. The two slots of each block are at a distance from each other axially, Figs. 5b, 8, so that one arm 44 is on each side of three coupling plates 46, 47, 48, see also Figs. 7-11, which have slots engaged by pins 49 secured to the stationary machine frame. At the outer ends of the arms 44 pins 50a, 50b, 50c are secured, of which 50a, 50b pass through openings 51, 52, 53 in the slidable coupling plates 46, 47, 48, respectively and through one of arms 44 to engage corresponding slots 54 in the kind of operation indicator rack 55, Fig. 4. At one end, the coupling plates have teeth 56 meshing with corresponding teeth of arms 57, 58, 59, which are rotatably journalled on a shaft 60 and have rollers 62 normally pressed by springs 61 to permanently engage cams 63, 64, 65, respectively, on a main drive shaft 66 driven by the crank 15 or a motor. The crank 15 drives the shaft 66 via toothed wheels 1510 and 1511, Fig. 21. Into the openings 51, 52, 53 projections 67a-h, 68a-d, 69a-d extend, Figs. 9-11, in different positions or levels in the different coupling plates. However, for each coupling plate said projections are in the position, into which the pins 50a, 50b are moved by the kind of operation indicator rack 55 for the operation corresponding to the motion of the coupling plate concerned, as described below. As will be described below, the kind of operation indicator rack 55 may assume five different positions, corresponding to: multiple items operation, addition, resetting, reading and multiple items total-taking, respectively, counting from the top. In Figs. 9-11 the pins 50a, 50b, 50c shown in dotted lines are in the positions, representing addition, resetting, and reading, respectively. The position above the position of addition in Fig. 9 represents multiple iems operation and the position below the position of reading in Fig. 11 represents multiple items total-taking.

The coupling plates 46—48 also have openings 70, 71, 72, respectively, through which the pin 50c for coupling the multiple items totalizer extends. This pin also passes through a slot 54 in the indicator rack 55. The adding plate 46 has a notch 73 at the uppermost position of the pin 50c. When the pin 50c is in the notch 73 the machine is set for multiple items operations. When said pin 50c is in its lowermost position, it is in a notch 74 at the lower end of the opening 72 of the resetting plate 48, and then the machine is set for multiple items total taking. The opening 71 of the reading plate 47 is, on the contrary, smooth and gives free passage to the pin 50c in all positions, because no reading shall be effected during multiple items operations.

When the cams 63—65 are rotated, the coupling plates 46—48 will be reciprocated rectilinearly, as indicated by arrows in Figs. 9-11. In accordance with the setting of the pins 50a, 50b, 50c into different levels, which is described below, said pins are reciprocated by said plates and thus move the totalizers 22—24 radially in relation to the shafts 27, 29, 31. The totalizers are consequently brought into engagement with or disconnected from the corresponding setting racks 42. If then one or more of the totalizers follow the adding plate 46, these totalizers will be coupled or set for addition. Totalizers following the reading plate 47 become coupled or brought into engagement for reading or sub-total taking. Totalizers following the resetting plate 48 become coupled for resetting, i. e., taking grand totals.

The pin 50a is connected with the clerks' totalizers 22, the pin 50b with the transaction totalizers 23 and the pin 50c with the multiple items totalizer 24. From Figs. 9-11 it is evident that in the five different height or level positions of the pins 50a-c the totalizers become coupled or set as follows:

1. In the uppermost position multiple items operation: only the pin 50c, which then follows the adding plate 46.
2. In the next position, addition, Fig. 9: only the pins 50a, b, which then follow the adding plate 46.
3. In the middle position, resetting, Fig. 10: only the pins 50c, b which then follow the resetting plate 48.
4. In the position next to the bottom reading, Fig. 11: only the pins 50a, b, which then follow the reading plate 47.
5. In the lowermost position multiple items total-taking: all pins 50a-c, of which the pins 50a, b follow the adding plate 46, while the pin 50c follows the resetting plate 48. Consequently, the multiple items total is entered into the selected totalizers 22, 23, while the totalizer 24 is reset.

In the positions 2 and 5 above the pin 50a may, however, be left unactuated, as described below. Figs. 9-11 also show that each pin 50a-c in each level can be actuated by but one single plate at a time.

The totalizer engaging mechanism referred to under this heading effects the setting or selection of the kinds of operation.

*Selecting individual totalizers*

The end plates 25, 26, Figs. 3 and 5a, have bent-down portions 75, whose lower sides have teeth or racks meshing with toothed wheels or pinions 76, 77, respectively. The parts 75 are guided in horizontal slots of the frame 78. Each of the opposite end plates 26, 28 carries a projection 79, Figs. 2, 5b, 6 and 22, sliding in a slot in an intermediate wall 80. The pinion 76 is rigidly connected with a second pinion 81 meshing with teeth 82 on a clerk's indicator rack 83 for the upper group of totalizers 22 (clerks' totalizers). Similarly, the pinion 77 is rigidly connected with a pinion 84 meshing with teeth on a transaction indicator rack 85 for the lower group of totalizers 23 (transaction totalizers, Fig. 5). When the racks 83, 85 are displaced upwards or downwards, that is are reciprocated in their longitudinal direction, the upper and lower totalizer groups 22, 23, respectively, are obviously displaced axially along the shafts 27, 29. By means of the racks 83, 85, whose actuation is described below, it is consequently possible to set one arbitrarily selected totalizer of each of the groups 22 and 23, or one single totalizer, or no totalizer at all, opposite the setting racks 42.

*Keybanks*

In general, a key bank, for instance, an amount bank 12, Figs. 16 and 17 has a number of keys, having pins 217, 218 which cooperate with a key locking slide 213 and a setting rack releaser 86, respectively. The slide 213 has slots 214 with projections 215 adapted to lock the keys in depressed position as shown at key "3" in Fig. 16. In Fig. 17, the key "3" is shown in its normal, non-depressed position. The setting rack releaser 86 is pivoted on a shaft 90, Fig. 17, secured in the bank and has an oblique or bevelled part 86a and a projection 87. A torsional spring 219 tends to rock the releaser 86 in clockwise direction on the shaft 90 so that the inclined part 86a is engaged by the pins 218 on the keys. If no key is depressed the projection 87 of the releaser is held just above a projection 88 of the corresponding setting rack 42. When a key is depressed the pin 218 rocks the rack releaser 86 in a counter-clockwise direction, Fig. 17, so that the projection 87 is moved out of the path of motion of the projection 88.

The key banks are secured to two stationary beams 94 and 212, Figs. 2 and 16, and the key locking slide 213 extends downwards through corresponding slots in the beam 212. The locking slide 213 is pressed downwards by a spring, so that the projection 215 of the slide engages the pins 217, and in that position the lower end of the slide 213 is just above a key releasing rod 206. This rod is secured to two arms 205, fast upon a shaft 207, rockably journalled in the machine frame. The releasing rod 206 is common for all the key banks and extends laterally across the machine. A spring 209, one end of which is secured to a pin 210 on the arm 205 and the other end to a pin 211 on the machine frame 78 presses the arm 205 against a roller 204, secured to one arm of a releasing lever 201 pivoted on a stud 202 in the machine frame 78. Thus, the spring 209 presses the other arm of the lever into permanent engagement with a cam 200, Figs. 14 and 16, secured to the main driving shaft 66. The cam 200 has an offset 200a and a higher portion 200b, which cooperates with a roller 203 on the upper arm of the lever 201.

The lever 201 also has a finger 224 extending upwards from the lower arm of the lever, and having an offset 225. The upper straight part of this finger normally engages a roller 223, Figs. 17 and 18, of a keybank locking slide 220, which is slidably connected to the beam 212 by means of pins 221 in the beam engaging slots 222 in the slide. A spring presses the slide 220 against the finger 224. The slide 220 has slots 226, one for each key locking slide 213 and in the normal position, that is the position of rest of the machine, the slides 213 can move freely in the slots 226. Each locking slide 213 also has a slot 227 on its rear side through which the keybank locking slide 220 has free passage in the normal position of slide 213.

When the machine is started and the main shaft 66 is rotated, the upper end of the lever 201 immediately after the start is rocked into the offset 200a of the cam 200 by the spring 209.

Thus, the finger 224 is lifted and the releasing rod 206 lowered. The spring of the keybank locking slide 220 then presses the slide and its roller 223 down into the offset 225 of the finger 224, thus moving the slide 220 upwards in relation to key "3" in Fig. 17. Then the slots 226 of the slide 220 are moved so that they do not register with the key locking slides 213 of the key banks, and the unbroken portions between the slots of slide 220 enter the slots 227 of the slide 213 and lock said slide. Consequently, the keys in all the key banks are locked against depression. At the continued rotation of the main shaft 66 the roller 203 of the lever 201 is engaged by the higher part 200b of cam 200 so that the lever 201 is first moved to its normal position, shown in Fig. 16, in which the roller 223 and the slide 220 are restored to their normal positions, Figs. 17 and 18. Then the lever 201 is rocked further counter-clockwise from said normal position so that the key releasing rod 206 is lifted, which lifts the key locking slides 213 above their normal position and consequently, the projections 215 are lifted over the pins 217 of those keys which have been depressed. The keys are then restored by their springs 217I which press the keys outwards. During this counter-clockwise rocking motion of the lever 201, this lever does not act upon the slide 220 because the roller 223 then engages the uppermost straight portion of finger 224, as shown in Fig. 18.

By this arrangement all key banks in the machine are locked and released at suitable moments of time during the operation of the machine.

*Setting the amounts*

As described above, each amount key bank 12 has a rack releaser 86, Figs. 2 and 17, having a projection 87, which normally is immediately above the upper side of the lowest one of a number of projections 88 of the corresponding amount setting or actuator rack 42 and consequently prevents said rack from moving upwards under the action of its lifting spring 89 during the operation of the machine, if no key has been depressed in the corresponding key bank. The projections 88 engage in well-known manner the amount key depressed, and the distance between the upper edge of a projection 88 in the position of rest and the lower edge of the corresponding key is that multiple of the pitch of the totalizer wheels 22, 23, 24, which is equal to the numeral value of the key. The racks 42 have longitudinal slots 91, 91a through which two stationary shafts 92, 93 pass which are secured to the machine frame. In the lateral direction the racks 42 are guided at the top by slots in laterally extending stationary beams 94 and at the bottom by peripheral slots in the shaft 93. Each rack 42 has a front row of teeth 95 for cooperation with the front totalizers 22, 23 and a back row of teeth 96 for cooperation with the listing totalizer 24. The racks 42 also have tens transfer teeth 97 in accordance with United States Patent No. 2,143,599. For the sake of clearness the tens transfer mechanism is not shown except for the uttermost right rack 42 in Fig. 5.

The tens transfer mechanism is claimed in the said U. S. Patent No. 2,143,599 but forms no part of the present invention.

For a tens transfer, the tooth 97, Fig. 13, is moved by a tens transfer slide 164 normally held in its upper position by a spring 168. The slide 164 (Figs. 13 and 5b) is movable rectilinearly on the rods 92 and 233, Figs. 2 and 5b and its motion is effected by cams 234 secured on the rod or shaft 233. On this shaft also an arm 232, Fig. 3, is rigidly secured, and by means of pivots and links 231, 230, 229, 228, the shaft 233 is rocked to and fro by cams 227 on the main shaft 66 to effect the tens transfer operation. To each tens transfer slide 164, Fig. 13, a pivot 171 is secured for each totalizer 22, 23, 24. On each pivot 171 a releasing arm 165 is journalled having two legs 169, 170. One end of a spring 172 is secured to the arm 165, while the other end of said spring is connected with a catch 167, to hold said catch against a projection 166 on the leg 170. In this position, the releasing arm 165 yields under the pressure of a tens carrying tooth 163 of the totalizer pinion 22, when said pinion moves from the numeral "9" to "0." During this motion of arm 165 the catch 167 enters a lower notch 166a of the projection 166, thus holding the arm and the leg 169 in their position for tens transfer. When the pinion 22 moves in the opposite direction during total-taking operations, the tooth 163 is stopped by the arm 165, which cannot swing upwards (counter-clockwise) from the position shown in Fig. 13 because it is locked by the catch 166.

In addition to the five racks 42 corresponding to the amount key banks there are two amount racks 42 to the extreme left in Fig. 5a having no key-banks. These additional racks constitute overflow racks, that is, they actuate the two extreme left wheels of the totalizers beyond the capacity of the key banks, that is, the wheels of the two highest denominations. In adding operations, these two overflow racks are not released (just as the other racks 42 are not released, when no key in their amount key banks 12 has been depressed) and do not move. In adding operations, the totalizer wheels of the two highest denominations are consequently actuated only by tens-carrying operations. But in total-taking operations (reading and resetting) all the racks 42 are released and actuated in the same manner.

Adjacent to each amount setting rack 42 is its amount indicator rack 98 slideably journalled which has longitudinal slots 99 guided longitudinally by stationary shafts 92, 100 secured to the machine frame 78. In the lateral direction the indicator racks 98 are guided at the bottom by slots in the stationary beams 94 and at the top by slots in a stationary beam 101 extending in the lateral direction. Each indicator rack 98 has a row of teeth 102 in mesh with a toothed wheel 102c which is rigidly connected with a toothed wheel 102a. Each wheel 102a is rigidly connected with an amount indicator wheel 103 for the clerk's side, visible in the window 18, and the wheel 102a also meshes with a toothed wheel 102b, which meshes with a toothed wheel 102d (Figs. 2 and 14) rigidly connected with an amount indicator wheel 104 for the customer's side. Via a toothed gear 105 the motion of the indicator racks 98 is transferred to the printing mechanism in well-known manner. The printing mechanism may be of any well-known construction and forms no part of this invention. For this reason it has not been shown.

On a stationary shaft 106 rotatably journalled in the machine frame, two rocking arms 107 are rotatably journalled, which are rigidly interconnected by shafts 108, 208, forming together a coupling device which extends across all the amount racks 42, 98 and serves to couple said racks together in pairs. Upon the shaft 108 pinions 109 are journalled, one for each pair of racks 42, 98. The axial width of each pinion 109 is equal to the total width of one pair of the racks 42, 98. The rack 98 has a back row of teeth 98a having the same shape as the back row of teeth 96 of the rack 42. Each pinion 109 is kept ready for engagement with said two rows of teeth 96, 98a of the racks 42, 98 by a catch or detent 110, which is pressed in between two teeth of the pinion 109 by a spring 111, Fig. 2. On the shaft 233, Figs. 2, 3, and 4, journalled in the machine frame two rocking plates 1107, Fig. 20, are rotatably journalled, which have rollers 1108 normally pressed by springs 1109 to permanently engage cams 1110 on the main driving shaft 66. Each rocking plate 1107 has a slot 1111 engaging a pivot 1112 on the rocking arm 107. From the cams 1110, Figs. 14 and 20, the coupling device 107, 109 for the amount racks 42, 98 is rocked to and fro on the shaft 106 via the rocking plate 1107, in such manner that during the upward motion of the racks 42, 98 at the operation of the machine the pinions 109 are disconnected, as shown in Fig. 2. When the racks have reached their top position, the pinions 109 are rocked into engagement with said rows of teeth 96, 98a of the racks and consequently couple said racks 42, 98 to move downwards in unison, thus causing the rack 42, at its return to the position of rest, to drive the rack 98 via the pinion 109. Such return is effected in well-known manner by a restoration rod 112, Figs. 2, 14, to which is imparted a reciprocating motion from cams 116 on the driving shaft 66 via links 113 and levers 114 rotatably journalled on the shaft 115. Because the distance across the machine between the setting racks 42 on the right and on the left is relatively great, certain arrangements are made to avoid deflection of the rod 112. Thus, each amount setting rack 42 has a lug 1142, Fig. 2, and the arms 114 are rigidly interconnected by means of a rod 112a, which normally engages the upper side of the lug 1142. In this way, the two rods 112, 112a together carry the stresses caused when they move the amount racks 42, 98 downwards. Thus, the stresses on the rod 112 are reduced.

The position of rest (zero position) of the racks 42 is their lowermost position (Fig. 2). They are moved upwards by their springs 89 (when the restoring rod 112 moves upwards) and restored downwards by the restoration rod 112. The position of rest of the racks 98 is their uppermost position. They are moved downwards by the racks 42 via wheels 109 and are restored upwards by the restoration rod 112. When the rod 112 moves upwards (simultaneously as the racks 42 move upwards), it returns the indicator racks 98 (from their final position at the preceding operation of the machine) to their uppermost position. Then the restoration rod 112 again moves downwards, returning the racks 42 to their lowermost position. In Fig. 2 the racks 42, 98 are shown in their respective zero positions.

The kind of operation to be effected is set, or selected, from the key bank 13 just as an amount is set from the key banks 12.

Thus, the kind of operation setting rack 117, Fig. 4, cooperates with the kind of operation indicator rack 55 just as the corresponding racks 42, 98 of the amount setting mechanism cooperate. During their motion downwards the racks 55, 117 are coupled together by means of a separate toothed coupling wheel or pinion 109a on a separate rocking arm 107a actuated from a cam 110a, Fig. 14, on the shaft 66 in the same manner as the rocking arms 107 are actuated. Thus, the rack 55 is moved downwards to different positions for the different kinds of operations, viz., counting from the top: Listing (multiple items operation), addition, resetting, reading and listing total (multiple items total-taking), as described above. Consequently, in the order just mentioned, said five positions of the kind of operation racks 55, 117 correspond to the positions of the amount racks for the numeral values 0, 1, 2, 3 and 4, respectively. However, there is the difference that the releaser 118 of the bank 13 has its projection 118a, Fig. 4, one pitch or step above the upper edge of the lowest stopping projection 119 of the setting rack 117. For this reason the racks 55, 117 will be moved one step or pitch, even if no key of the bank 13 has been depressed. This means that the machine is automatically set for addition, when no operation control key 13 is depressed.

As described above, the keys AX and *X both serve for reading the totalizers, while the keys AZ and *Z both serve for resetting the totalizers. Consequently, the kind of operation setting rack 117 has its stopping projections 119 placed in such a manner that when the key AX or *X is depressed, the rack 117 moves upwards the same distance in order to set the indicator rack 55 into the reading position, i. e., the fourth step from the top. When the key AZ or *Z is depressed, the indicator rack 55 will be set in the same manner into the resetting position, i. e., the third step from the top.

At the reciprocating motion of the rack 55 under the control of the key depressed in the key bank 13, the pins 50a, 50b, 50c engaged by the slots 54 of said rack are moved to different positions in relation to the projections 67a–h, 68a–d, 69a–d and the notches 73, 74 of the coupling plates 46—48, so that the totalizers 22—24 are moved into engagement with or disconnected from the amount setting racks 42 and are actuated by them in the manner described above.

It is evident that when the plates 46—48 are moved to the left (Figs. 9–11), the projections 67b, 67f, 69b, 69d, 68b and 68d move the pins 50a and 50b correspondingly, thus engaging the totalizers 22 and 23 with the amount setting racks 42. The return motion of the plates 46—48 to the right into their normal position is effected by springs 61 (Fig. 4), one for each plate when the rollers 62 of the arms 57, 58, 59 engage the lower part of the cams 63, 64, 65 on the main shaft 66. During this return motion the projections 67a, 67e, 69a, 69c, 68a and 68c opposite the projections 67b, f, 68b, d and 69b, d, engage the pins 50a, 50b and thus the totalizers 22 and 23 are disengaged from the amount setting racks 42.

*Selecting individual totalizers*

For selecting the totalizers a clerk's indicator rack 83, Figs. 3, 5a and 15, for the clerk's totalizers 22 and a transaction indicator rack 85 for the transaction totalizers 23 are provided as mentioned above. These racks cooperate with the clerk's and transaction setting racks 120, 121, respectively and may be coupled to them by means of two toothed coupling wheels or pinions 109b of a separate rocking arm 107b, operated from a cam 110b, Fig. 14, on the shaft 66, in the same manner as the rocking arm 107. Separate rack releasers 122, 123 are provided, the former for the clerk's rack 120 at the clerk's key bank 11 and the latter for the transaction rack 121 at the transaction key bank 10. The totalizers 23 corresponding to the key bank 10 may consequently be selected independently of the totalizers 22 corresponding to the key bank 11, and vice versa.

The kind of operation racks 117, 55 and the totalizer selecting racks 83, 85, 120, 121 are positively restored to their positions of rest by restoring shafts 124, 125, respectively, entering corresponding guiding slots 126, 127 of the setting racks, respectively. Like the shaft 112 they receive reciprocating motions from the main shaft 66 via systems of links 113a, levers 114a, and cams 116a, and 113b, 114b, 116b, respectively. The motions of the racks 55, 83, 85 are transferred to indicator wheels and to the printing mechanism similarly as described for the amount indicator racks 98. It is to be observed that the lowest positions of the setting racks 42, 117, 120, 121 are their positions of rest or zero positions, while the positions of rest of the indicator racks 98, 55, 83, 85 are their uppermost positions.

The setting positions of the totalizer racks 83, 85, and 120, 121, respectively, correspond to the positions of the amount racks for the numeral values 0, 1, 2, 3, and 4. To the "0" position there are, however, no corresponding totalizer wheels on the shafts 19, 20. If in this "0" position the totalizer carriage is brought into operative position opposite the racks 42, there will obviously be no engagement between the totalizer and the racks 42.

When an amount is entered in the cash register, such amount shall be entered both into a clerk's totalizer and into a transaction totalizer. It is evident that money received comes exclusively from "cash" sales (*) or from "received on account" (+), and that the amounts received on said two transactions are the clerk's cash balance for the day. For "charges" (sales on credit<) and "paid out" (—), the amounts, consequently, shall be entered only in the corresponding transaction totalizer but not in the clerk's totalizer. To effect this, the transaction indicator rack 85 has a pin 128, Figs. 3 and 12, entering a slot 129 of a leg bent-over of a rocking member or clerk's disengaging lever 130, rotatably journalled on the shaft 100. The member 130 extends across the machine and has its opposite bent-over leg adjacent to the adding plate 46. Said leg has a slot 131 engaged by a pin 132, Figs. 7, 8, and 9, of a plate 133, which is displaceable on pins 134 on the adding plate 46. The projections 67b, 67d at one side of the upper opening 51 of said coupling plate are placed on the plate 133, which is normally kept in the position shown in Fig. 9, corresponding to "addition" for "cash" and "received on account" operations.

It may be mentioned that the keys L, O and K of the key bank 13 when depressed do not act upon the rack releaser 118 of that bank.

The devices described operate as follows:

*Addition*

When a clerk's key 11, a transaction key 10 and one or more amount keys 12 are depressed but no key in the kind of operation bank 13, the corresponding rack releasers 122, 123, 86, respectively, are rocked out of engagement with the racks. Then the starting key 14 is depressed and the machine is started, by hand or by a motor. As soon as the coupling wheels 109b, 109a have been disconnected from the setting racks 120, 121, 117 the restoring shafts 125, 124 start moving upwards in the slots 127, 126 under the driving action from their respective cams on the main shaft 66. The racks 120, 121 are then drawn upwards by their springs 89, until they are stopped by the depressed keys in the banks 11, 10. The kinds of operation setting rack 117 is, however, only lifted one single step by its spring 89 and then stopped by the projection 118a of the rack releaser 118 for the key bank 13. The shafts 124, 125, in their upward motion, restore the indicator racks 83, 85, 55 to their uppermost position. When the restoring shafts 124, 125 have reached their uppermost position, the indicator racks 83, 85, 55 are coupled with their setting racks 120, 121, 117, respectively, by means of the coupling pinions 109b, 109a, whereupon all these racks are pulled downwards, when the restoring shafts 125, 124 in their return to the position of rest engage the lower end of the slots 127, 126 and restore the racks 120, 121, 117 to their position of rest. When the clerk's indicator rack 83 moves downwards its teeth 82 rotate the pinions 81, 76, thus causing the carriage 19, 25, 26 with the clerks' totalizers 22 to slide longitudinally on the shaft 27, until the set of wheels 22 corresponding to the clerk's key 11 depressed are just opposite the amount setting racks 42. Similarly, the lower carriage 20, 28 with the transaction totalizers 23 is displaced by the transaction indicator rack 85 via the wheels 84, 77. Now, the clerk's totalizer and the transaction totalizer corresponding to the keys 11, 10 depressed are opposite the racks 42.

Because no key of the bank 13 was depressed, the setting rack 117 was lifted one single step, as mentioned above. After it has been coupled to its indicator rack 55 by means of the pinion 109a, the rack 117 is restored to its position of rest, moving the rack 55 one step. This rack then moves the three pins 50a, 50b, 50c, so that the arms 44 rotate on the pins 45, 39, respectively. If now the * or + key has been depressed, the pin 128 of the rack 85 has been moved downwards one or two steps, respectively, in the slot 129 and has consequently remained in the upper straight portion of said slot, thus causing no rocking of the clerk's disengaging lever 130; see Fig. 12, in which the positions of the pins 128, 132 are marked by use of indices in the positions corresponding to the different transactions. The plate 133 on the adding plate 46 consequently remains in its lower position, shown in Fig. 9, and the pin 50a thus stops in a position between the projections 67a, 67b, and the pin 50b between the projections 67e, 67f while the pin 50c is moved into the wide opening 70.

After the restoring shafts 124, 125 have returned to their position of rest or lowest position, the pinions 109 are disconnected from the amount racks 42, 98, and the restoring rod 112 begins moving upwards in the slots 91. Those amount racks 42, which have been released as a result of the depression of amount keys 12, are then pulled upwards by their springs 89, until that projection 88 of the rack 42, which corresponds to the key depressed, is stopped by said key. During its upward motion the rod 112 restores, to their zero or uppermost position those indicator racks 98 which had been drawn down in the next preceding operation of the machine.

When the restoring rod 112 has reached its uppermost position, the racks 42 are again coupled to their respective indicator racks 98 by the pinions 109. Simultaneously, the coupling plate 46 receives from the cam 63 on the main shaft 66 a motion to the right in Figs. 2 and 4, so that the pins 50a, 50b are moved by the projections 67b, 67f, Fig. 9, and consequently rotate the levers 38 and the shafts 27, 29 via the rods 44. At this motion the pins 60a, b move freely in the openings 52, 53 of the plates 47, 48. Consequently, the shafts 39 on the front side of the machine, that is, at the totalizers 22, 23, are then displaced to the left in Figs. 2 and 4 and will displace the totalizer groups or lines 22, 23 due to their engagement with the slots 40 in the end plates 25, 26, 28, until the two totalizers selected mesh with the rows of teeth 95 on the front side of racks 42, as shown at the totalizer 22 in Fig. 2. Simultaneously the catches 33 for the totalizer wheels engaged are disconnected by the fingers 41, rocked by the shafts 27, 29.

The actuating pin 50c of the totalizer 24 is in the big openings 70, 71, 72, Fig. 9, of the plates 46, 47, 48. Consequently, this totalizer remains disconnected during the motion of said plates.

As soon as the totalizers have been brought into engagement with the racks 42, the restoring rod 112 moves downwards and engages the lower end of the slots 91, causing those of the racks 42 which have just been lifted, to be pulled down to their position of rest, while tensioning the springs 89. This motion is transmitted both to the indicator racks 98 by means of the wheels 109 and to the totalizer wheels 22, 23, and consequently the amount set is shown on the amount indicator wheels 103, 104 and also entered or accumulated in the selected totalizers for the clerk and the transaction. Via the gear 105, the amount is also transferred to the printing mechanism and printed on the control slip and the check or receipt, in well-known manner. The totalizers are disengaged at proper time from the amount setting racks 42, as described above.

If the < or − key of the transaction key bank 10 has been depressed, the pin 128 will enter the curved portion of the slot 129 of the clerk's disengaging lever 130, Figs. 3, 7 and 12, during the downward motion of the transaction indicator rack 85. Consequently, the lever 130 is rocked on the shaft 100 and the pin 132 is moved in the slot 131, so that the plate 133 is lifted and moves its projections 67b, 67d one step above the opposite fixed projections 67a, 67c of the adding plate 46, Fig. 7. When the plate 46 then is reciprocated, only the lower or transaction totalizer 23 but not the upper or clerk's totalizer 22 is coupled to the setting racks 42. Thus, "charge" and "paid out" are entered in the transaction totalizers concerned but not into the clerks' totalizers.

The indicator racks 98, 83, 85, 55 are restored to their zero or uppermost positions, when the restoring shafts 112, 125, 124 move upwards at the next registration, said shafts engaging the lower ends 98u, 83u, 85u, 55u of said racks projecting downwards into the slots 91, 127, 126. Thus, the racks are moved upwards.

After the depressed keys have then been released and returned to their positions of rest as described above, the machine is ready for the next registration.

*Resetting*

After the depression of a resetting key, say AZ,, a clerk's key 11 and the starting key or bar 14, the machine is started. The clerks' indicator rack 83 and the kind of operation indicator rack 55 are coupled by the corresponding wheels 109b, 109a to the racks 129, 117 and pulled downwards to the positions corresponding to the two depressed keys. Because no transaction key was depressed, the transaction setting rack 121 remains in its position of rest and the transaction indicator rack 85 is only returned to its uppermost or zero position by the restoring shaft 125 and fixed in such position by being coupled to the rack 121 by the corresponding pinion 109b. The transaction totalizers 23 will, consequently, be stopped in a position, in which none of the wheels 23 is opposite the racks 42.

As described above, the kind of operation indicator rack 55 is pulled two steps downwards at the resetting operation and consequently the pin 50a stops in the position shown in Fig. 10, that is between the projections 69a, 69b of the resetting plate 48 and the pin 50b between the projections 69c, 69d, while the pins 50a–c move freely in the plates 46, 47. From the cam 65 of the main shaft 66 the plate 48 is now reciprocated in such manner that the selected totalizer 22—in analogy with the operation just described for addition—is brought into engagement with the amount setting racks 42, before they are raised, but is dis-connected therefrom, just as said racks 42 are coupled by the pinions 109 to their respective indicator racks 98. The racks 42 are released from the projections 87 of the rack releasers 86, when a resetting key is depressed. (The mechanism for this purpose forms no part of this invention and is consequently not shown nor described.) Thus, when the racks 42 are moved upwards by their springs 89, they are already in engagement with the wheels 22 and rotate them clockwise in Fig. 2, until their tens transfer teeth 163, which are broader than the other teeth, engage the releasing arms 165 arranged on the tens transfer slide 164, Figs. 5b and 13, thus causing the amount setting rack to be stopped, because the releasing arms 165 are locked against motion in this direction by the projection 166 of the same, which engages the edge of the catches 167 as described above. This position is the zero position of the totalizer wheels 22 and their motion to this position from their original position in the moment in which they were coupled to the racks 42, represents in well-known manner the numeral value upon which the totalizer wheel was set. When the resetting plate 48 returns to its position of rest and the engaged totalizer is then disconnected from the racks 42, all wheels of said totalizer show zeros and the totalizer has consequently been reset. The amount previously accumulated in said totalizer is transferred to the indicator racks 98 after said racks have been coupled to the racks 42 for the downward motion, and is shown as a grand total by the indicator wheels. The amount is also printed on the check and the control slip. The resetting is, consequently, also a taking of a grand total of the totalizer concerned.

It is to be observed that during the operation just described the totalizers 23 are certainly displaced towards the racks 42, because the resetting plate 48 acts with its projections 69c, 69d on the pin 50b, but none of the totalizers 23 is opposite said racks and for this reason the totalizers 23 remain quite unactuated by the motion of the racks 42.

The resetting of a transaction totalizer 23 is effected similarly by use of the key *Z and a transaction key 10. At this operation all totalizers 22 remain unactuated.

Reading

A reading key AX or *X and accordingly also a key in the clerks' bank 11 or in the transaction bank 10, respectively, and also the starting key are depressed. The kinds of operation indicator rack 55 is, however, now pulled three steps downwards, causing the pin 50a to stop just between the projections 68a, 68b of the reading plate 47, Fig. 11, and the pin 50b between the projections 68c, 68d, while the pin 50c moves freely in the opening 71. In the other plates 46, 48 the pins 50a–c move freely. The plate 47 is now reciprocated from its cam 64 on the shaft 66 in such manner that the selected totalizer 22 or 23 is coupled to the setting racks 42, before the latter begin moving upwards, and remains engaged, until after said racks have returned to their zero or lowest position. In other words, the selected or engaged totalizer 22 or 23 is primarily reset, as described above under the heading "resetting," but then the totalizer is not disconnected but the amount is again entered into the totalizer during the return motion of the racks 42. Reading is consequently the same as subtotal taking in adding machines and the accumulated sum remains in the totalizer. The amount read is shown on the indicator wheels 103, 104 and printed on the check and the control slip.

Listing or multiple stems operation

The key L is depressed and thereafter an amount is set on the amount keys 12 and the machine is started after depression of the key 14. The key L, when depressed, moves inwards immediately above the uppermost projection 119L of the kinds of operation setting rack 117, thus locking said rack in its lowermost position and preventing it from being moved upwards by its spring 89. After the kinds of operation indicator rack 55 has been coupled to the rack 117, it will consequently not be moved, and the pins 50a, b for the totalizers 22, 23 are in the upper broad portions of the openings 51, 52, 53 and consequently remain unactuated at the reciprocating motion of coupling plates 46, 47, 48. The pin 50c for the totalizer 24 enters the notch 73 of the adding plate 46, but moves freely in the openings 71, 72 of the plates 47, 48. Thus, the totalizer 24 is moved by the adding plate at the operation of the machine and the amount set is added into the totalizer 24. The key L is not released at the end of the registering operation and thus new amounts may be successively entered and accumulated in the totalizer 24. (The means for latching down and releasing the kind of operation keys L, LT, AX and AZ, etc., form no part of this invention and are, therefore, not shown and described.) To take the total of said items or dependent multiple items, the key LT is depressed and releases the key L. Then a clerk's key 11 and a transaction key 10 and the starting key 14 are depressed. The kind of operation indicator rack 55 is now pulled downwards to its lowest position, moving the pin 50a for the totalizers 22 to a position between the projections 67c and 67d of the adding plate 46 and the pins 50b for the totalizer 23 between the projections 67g, 67h, while said pins move freely in the plates 47, 48. The pin 50c for the totalizer 24 enters the notch 74 of the resetting plate 48 but moves freely in the other plates 46, 47. Thus, the totalizer 24 is reset, because it follows the plate 48, while the selected clerk's and transaction totalizers 22, 23 follow the adding plate 46, so that the amount, which was accumulated in the listing totalizer 24 at the resetting thereof, is added into those totalizers 22, 23.

If for listing total or multiple items total-taking the < or − key in the transaction bank 10 is depressed, no clerk's totalizer is engaged at the operation of the machine for such total-taking, because the plate 133 is lifted by the rocking member or clerk's disengaging lever 130, Fig. 7, so that the displaceable projection 67b does not actuate the pin 50a for the clerks' totalizers at the operation of machine. Consequently, said totalizers remain disengaged. The machine in accordance with this invention thus gives a specified receipt, that is effects listing or multiple items operations, for all kinds of business transactions, also for "charge" and "paid out."

It should be mentioned that if the projections 67c, 67d, 67g and 67h of the plate 46 are cut away, the totalizer 24 becomes entirely independent of the other totalizers and consequently can be operated as a totalizer of an ordinary adding machine. In other words, it will then effect separate adding operations, which are not entered into the other totalizers.

While the forms of mechanisms herein shown and described are well adapted to fulfill the objects primarily stated, it is to be understood that it is not intended to limit the scope of the patent to the forms or embodiments disclosed except as specified in the appended claims.

What I claim is:

1. In a cash register, adding and accounting machine and the like, in combination, an actuator, a carriage, a totalizer on said carriage, a kind-of-operation mechanism for determining the operation to be performed, a movable add plate in said mechanism, means driven by said actuator for moving said add plate, a displaceable plate on said add plate, and a pin connected with said totalizer carriage and located in the path of motion of said add plate, said displaceable plate being normally in an effective position and movable with the add plate to engage the pin and being displaceable to an ineffective position so that it no longer engages the pin on movement of the add plate for engaging said totalizer with said actuator.

2. In a cash register, accounting machine and the like, in combination, an actuator, a carriage, a totalizer on said carriage, a movable add plate, means driven by said actuator for moving said add plate, a displaceable plate on said add plate capable of movement into effective and ineffective positions, a pin connected with said totalizer carriage and located in the path of motion of said displaceable plate to be engaged thereby when the displaceable plate is in effective position for bringing said totalizer into and out of engagement with said actuator at the operation of the machine, a transaction differential mechanism, and a coupling member between said displaceable plate and said transaction differential mechanism for moving said displaceable plate to the ineffective position in relation to said pin, when said transaction differential mechanism assumes certain positions.

3. In a cash register, accounting machine and the like, in combination, an actuator, a carriage, a totalizer on said carriage, a movable add plate, means driven by said actuator for moving said add plate, a displaceable plate on said add plate capable of movement into effective and ineffective positions, a pin connected with said totalizer carriage and located in the path of motion of said displaceable plate to be engaged thereby when the displaceable plate is in effective position for bringing said totalizer into and out of engagement with said actuator at the operation of the machine, a set of transaction keys, a rack settable differentially under the control of said transaction keys, a movable coupling member, and slot-and-pin connections connecting said coupling member both with said rack and said displaceable plate for moving the latter to the ineffective position so as to not engage said pin at the operation of the machine, when certain of said transaction keys are depressed.

HANS FREDRIK BIRGER HÖGFORS.